(12) United States Patent
Kuijk et al.

(10) Patent No.: US 10,277,340 B1
(45) Date of Patent: Apr. 30, 2019

(54) SIGNAL INTEGRITY DIAGNOSTICS FOR COMMUNICATION CHANNELS

(71) Applicant: Microchip Technology Incorporated, Chandler, AZ (US)

(72) Inventors: Maarten Kuijk, Antwerp (BE); Venkatraman Iyer, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 15/997,563

(22) Filed: Jun. 4, 2018

Related U.S. Application Data (60) Provisional application No. 62/618,990, filed on Jan. 18, 2018.

(51) Int. Cl.
 *H04B 17/30* (2015.01)
 *H04B 17/309* (2015.01)
 *H04B 17/20* (2015.01)

(52) U.S. Cl.
 CPC ........... *H04B 17/309* (2015.01); *H04B 17/20* (2015.01)

(58) Field of Classification Search
 CPC .............................. H04B 17/309; H04B 17/20
 USPC ......................................................... 375/226
 See application file for complete search history.

(56) References Cited

U.S. PATENT DOCUMENTS

| | | | | |
|---|---|---|---|---|
| 5,179,726 A | * | 1/1993 | Moon .................... | H03J 1/0008 348/E5.097 |
| 2007/0086315 A1 | * | 4/2007 | Huang ............. | G11B 20/10009 369/124.11 |
| 2007/0135071 A1 | * | 6/2007 | Lee ........................ | H04W 52/52 455/232.1 |

* cited by examiner

*Primary Examiner* — Michael R Neff
(74) *Attorney, Agent, or Firm* — TraskBritt (57) ABSTRACT

Systems, methods and devices for diagnosing signal integrity of a communication channel are disclosed, as well as related systems, methods, and devices. A method includes receiving an input signal from a transmission line of the communication channel and performing an autogain function on the input signal to generate a regulated output signal with a pre-determined voltage amplitude. The method also includes adding a disturbance signal to the regulated output signal to generate a summation output. The method also includes digitizing the summation output and analyzing the digitized summation output to determine an error level.

23 Claims, 9 Drawing Sheets

SIGNAL INTEGRITY DIAGNOSTICS FOR COMMUNICATION CHANNELS

CROSS-REFERENCE TO RELATED APPLICATION

This application claims the benefit under 35 U.S.C. § 119(e) of U.S. Provisional Patent Application Ser. No. 62/618,990, filed Jan. 18, 2018, the disclosure of which is hereby incorporated herein in its entirety by this reference.

TECHNICAL FIELD

Embodiments of the present disclosure relate generally to serial communication channels and more specifically to signal integrity in the communication channels.

BACKGROUND

In many embedded control systems, and other computing systems, movement of data between peripheral devices and a host, or between peripheral devices, can be a significant amount of data traffic on the various buses that may exist in such systems. Moreover, some of this data traffic may carry information and commands for real-time critical systems. Thus, signal integrity becomes an important factor in accurate communication.

In some systems, to determine signal integrity it is important that the margin is known in a communication system when transferring data from one point to another either via electrical transmission lines or via an optical channel. As one example, in automotive high-speed digital communications, the car companies want to know whether there is still enough signal integrity margin in each of their communication links. Each element in the communication link can deteriorate under aging, mechanical stress, temperature stress, and combinations thereof. Elements in the link may include: a cable driver circuit, a common mode choke at the transmit side, a connector at the transmit side, a cable, inline connectors, a connector at the receiving side, a common mode choke at the receive end, an equalizer, a phase-locked loop (PLL) for data recovery, and printed circuit board (PCB) traces.

The inventors of this disclosure foresee a need for an easy, fast, and inexpensive method to diagnose the signal integrity margin before bit error rates rise to an intolerable level during run-time.

BRIEF SUMMARY

Embodiments of the present disclosure comprise a receiver side of a communication channel including an autogain module, a disturbance generator, a summation module, a clock and data recovery module, and a data processor. The autogain module is configured to condition an input signal from a transmission line by automatically adjusting a gain between the input signal and a regulated output signal to generate a pre-determined voltage amplitude on the regulated output signal. The disturbance generator is configured to generate a disturbance signal with an amplitude proportional to the pre-determined voltage amplitude. The summation module is configured to add the disturbance signal to the regulated output signal to generate a summation output. The clock and data recovery module is configured to sample the summation output and generate at least a data signal from the sampled summation output. The data processor is configured to analyze a signal integrity of the data signal.

Additional embodiments of the present disclosure comprise a receiver side of a communication channel including a receiver, a disturbance generator, a summation module, a clock and data recovery module, and a data processor. The receiver is configured to estimate an amplitude of an input signal and generate an amplitude indication signal. The disturbance generator is configured to generate a disturbance signal with an amplitude proportional to an amplitude of the input signal and responsive to the amplitude indication signal. The summation module is configured to add the disturbance signal to the input signal to generate a summation output. The clock and data recovery module is configured to sample the summation output and generate at least a data signal from the sampled summation output and the data processor is configured to analyze a signal integrity of the data signal.

Some other embodiments of the present disclosure include a method of diagnosing signal integrity of a communication channel. The method includes receiving an input signal from a transmission line of the communication channel and performing an autogain function on the input signal to generate a regulated output signal with a pre-determined voltage amplitude. The method also includes adding a disturbance signal to the regulated output signal to generate a summation output. The method also includes digitizing the summation output and analyzing the digitized summation output to determine an error level.

Still other embodiments of the present disclosure include a method of diagnosing signal integrity of a communication channel. The method includes receiving an input signal from a transmission line of the communication channel and performing an autogain function on the input signal to generate a regulated output signal with a pre-determined voltage amplitude. The method also includes performing two or more loops of a process, each loop comprising; adding a disturbance signal to the regulated output signal to generate a summation output, digitizing the summation output, analyzing the digitized summation output to determine an available margin in the communication channel for the current loop, and adjusting an amplitude of the disturbance signal. The method also includes generating a results signal indicating a final available margin responsive to the available margin from at least two of the two or more loops.

Further embodiments of the present disclosure include a communication system comprising a transmit side including a data source, a transmission line configured for conveying a signal from the data source, and a receive side configured for receiving the signal from the transmission line as an input signal. The receive side includes an autogain module configured to condition the input signal from the transmission line by automatically adjusting a gain between the input signal and a regulated output signal to generate a pre-determined voltage amplitude on the regulated output signal. The receive side also includes a disturbance generator configured to generate a disturbance signal with an amplitude proportional to the pre-determined voltage amplitude and a summation module configured to add the disturbance signal to the regulated output signal to generate a summation output. The receive side also includes a clock and data recovery module configured to sample the summation output and generate at least a data signal from the sampled summation output, and a data processor configured to analyze a signal integrity of the data signal.

DETAILED DESCRIPTION

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

Various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any processor, controller, microcontroller, or a state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Various illustrative may be implemented using active analog circuitry using high-speed transistors, such as, by way of non-limiting example, bipolar, CMOS or BiCMOS devices.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, "serial communication channel" means a communication link that transmits information as a serial group of bits. The protocol of the link includes a group of bits as an information payload, which may be of various sizes and may include other bits such as, for example, start bits, stop bits, parity bits, and address bits. The physical layer of the link may be an electrical wired connection, using protocols such as, for example, RS-232, I²C, and SMBus. The physical layer of the link also may include an optical link such as, for example, optical fiber.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Embodiments described herein provide a signal integrity diagnostic system that can operate real time to provide analysis of a large portion of a communication channel. On request of the receiving side of a communication channel, the channel can be analyzed for how much jitter margin and vertical eye margin is still available in the system during run-time. Most, if not all, components in the communication channel, including passive components, connectors, cabling, electrical interference, electrical circuits like cable drivers, equalizers as well as PLLs and their function, are under test as part of the analysis.

Figure 1:
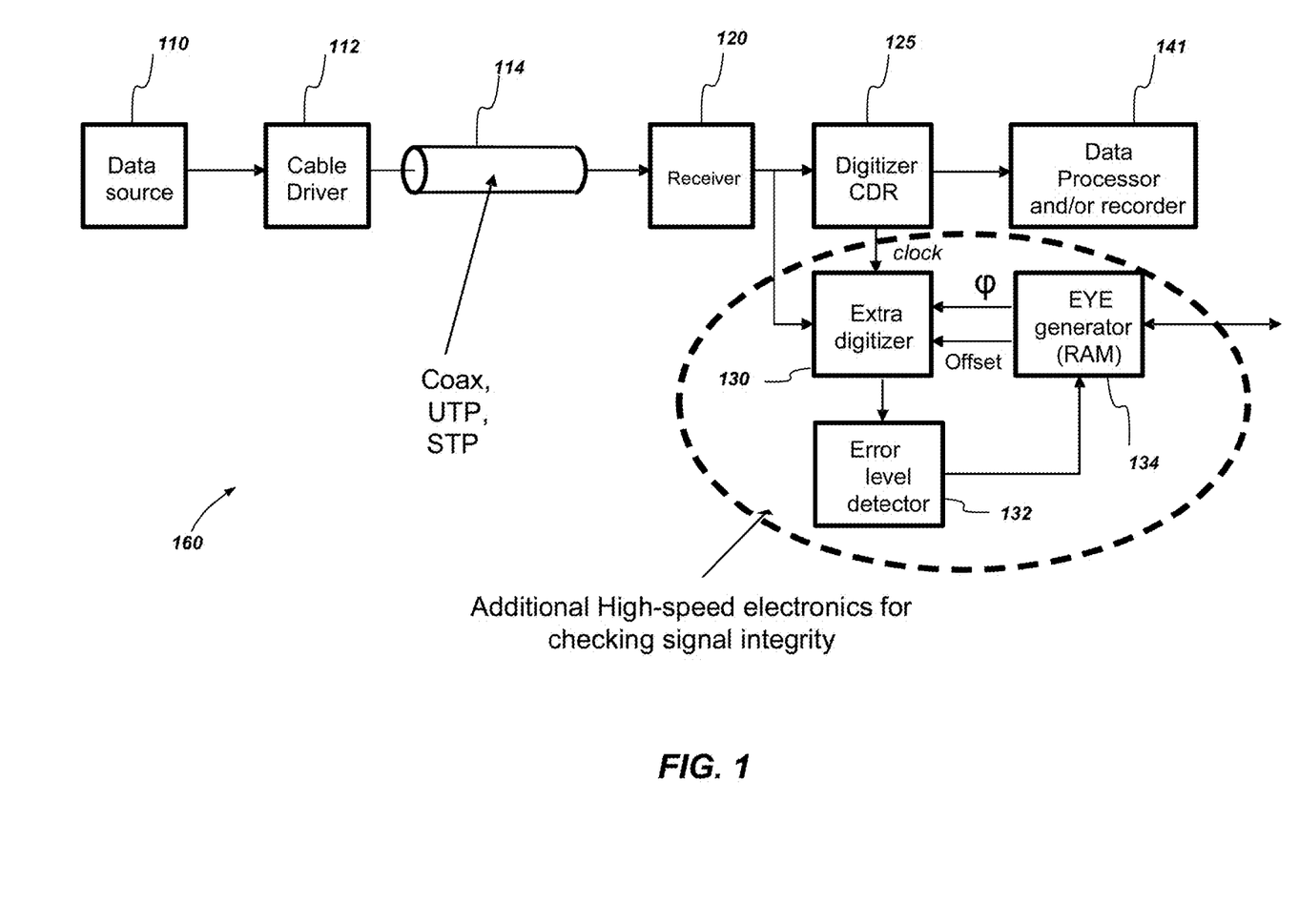
FIG. 1 is a block diagram of a communication channel with a conventional signal integrity checker that represents the state of the art.
Figure 2:
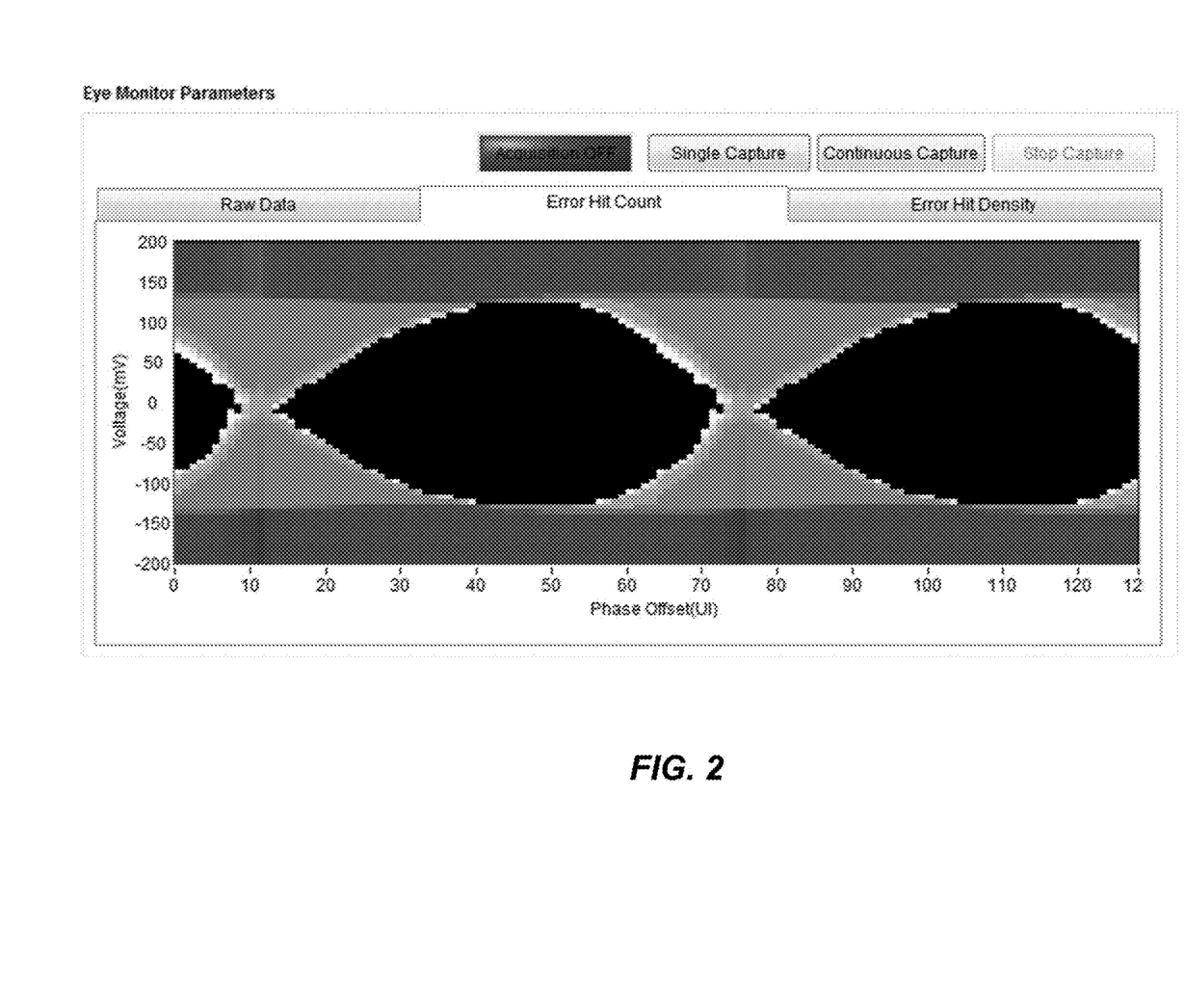
FIG. 2 shows an eye diagram that may be obtained from the signal integrity checker of FIG. 1 that represents the state of the art.

FIG. 1 is a block diagram of a communication channel 160 with a conventional signal integrity checker known to the inventors of this disclosure. FIG. 2 shows an example EYE diagram that may be obtained from the signal integrity checker of FIG. 1.

In FIG. 1, the communication channel 160 includes a data source 110 that generates a signal, which is conditioned by a cable driver 112 and sent along a transmission line 114, such as, for example, a coaxial cable, an Unshielded Twisted Pair (UTP) cable, a Shielded Twisted Pair (STP) cable, etc. A receiver 120 receives the signal and sends it to a Clock and Data Recovery (CDR) module 125, which sends a resulting clock and data to a data processor and/or recorder 141.

For the signal integrity checking an extra digitizer 130 is used to digitize the signal from the receiver 120. An error level detector 132 and EYE generator 134 operate to develop the EYE pattern that can be used to indicate signal integrity. The EYE generator 134 may include Random-Access Memory (RAM) for storing the resulting EYE pattern.

This conventional system samples the EYE at the receive side, not just in the middle of the EYE, but also at different phases and amplitude levels, recording, for example, the bit error rate at the different sampling points. The EYE that is built up inside the receiver 120 has a corresponding memory map that can for example be read out through a serial protocol, like I2C (inter-integrated circuit) and displayed as shown in FIG. 2.

Thus, in these conventional systems, a complex system measures errors in the communication channel 160 before the CDR module 125. This checking process can be slow, works only for certain types of CDR modules 125, requires significant additional chip area (as compared to systems without a CDR module), and above all, it does not include the performance of the CDR itself. In those cases, one typically makes an educated guess about the jitter tolerance of the subsequent CDR, which can be anywhere between 20% and 80% of a unit interval. The attractiveness of conventional systems is that they generate a result similar to an EYE measurement obtained in a laboratory environment, so it is readily understood. But it is now understood by the inventors of this disclosure that these systems do not give a full picture of the margin due to the unknown, and variable, jitter tolerance of the subsequent CDR. In addition, conventional systems can take significant silicon real estate, power to run the analysis, and can be quite slow.

Figure 3:
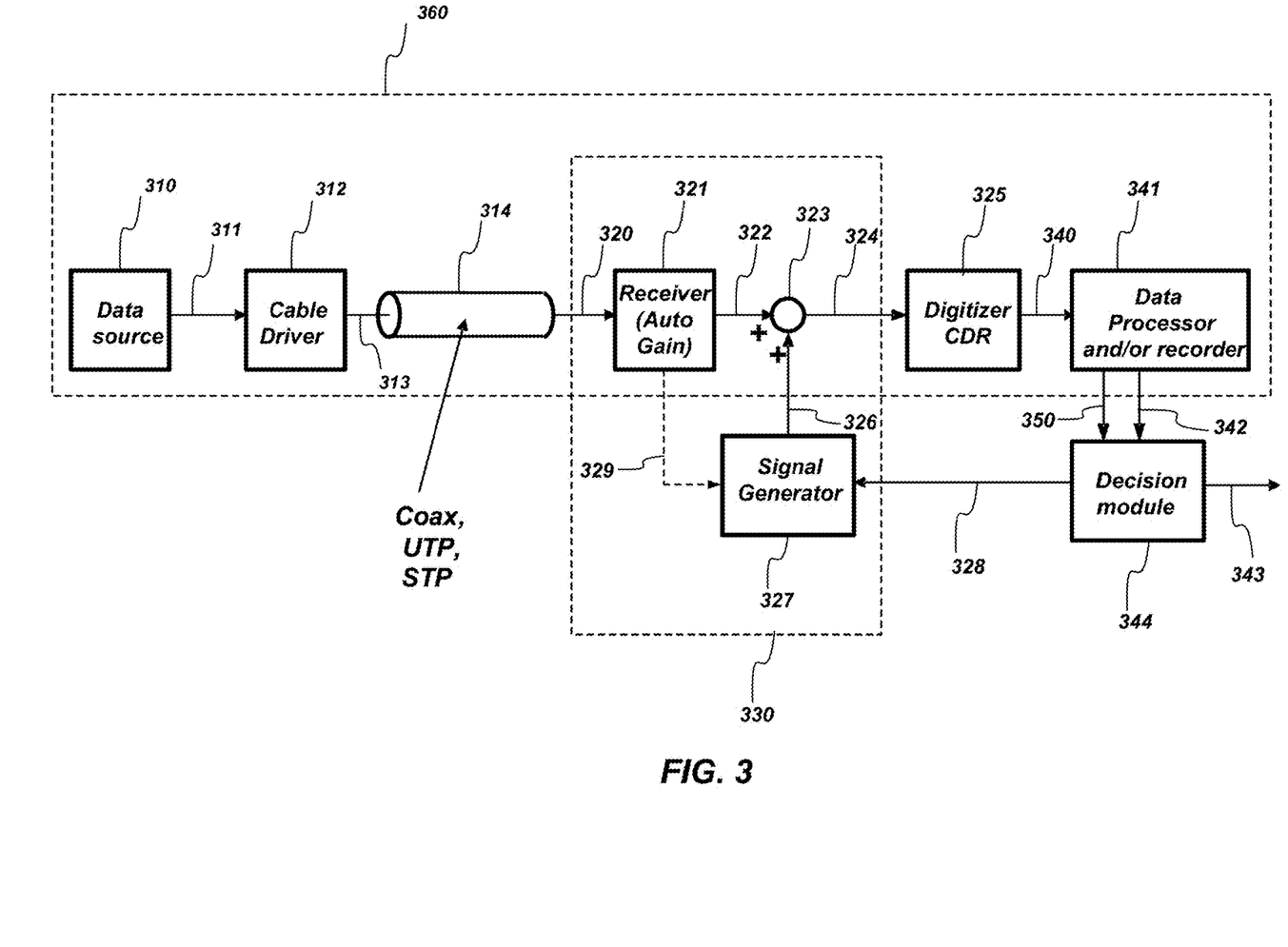
FIG. 3 is a block diagram of a communication channel with signal integrity diagnostics according to embodiments of the present disclosure.

FIG. 3: is a block diagram of a communication channel 360 with signal integrity diagnostics according to embodiments of the present disclosure. The communication channel 360 may include a cable driver 312, a transmission line 314, and a receiver 321. The transmission line 314 carrying a signal may be electrical (e.g., a coax cable, UTP cable, STP cable, or other suitable electrical conduits) or optical (e.g., fiber systems).

The entire communication channel 360 of FIG. 3 includes a data source 310, the cable driver 312, the transmission line 314, the receiver 321, a summation module 323, a CDR module 325, and a data processor 341. A signal conditioning module 330 includes the receiver 321, the summation module 323, and a disturbance generator 327 (also referred to herein as a signal generator 327).

The data source 310 transmits data at its output 311, which may be received, finally, at the data processor 341. The data source 310 may be the output of a digital system, like a processing unit, other digital circuitry, or directly from a sensor, such as, for example, a camera sensor.

A cable driver 312 prepares an output 313 to transmit its voltage signal over the transmission line 314. The output 313 may be in any suitable data format. As non-limiting examples, the format may be Non-Return to Zero (NRZ) data or multiple level data. The data may be encoded (e.g., 8b/10 encoding, 128b/130b encoding or 128 bit/130 bit, PAMS encoding).

The transmission line 314 carries the signal to the input 320 of a receiver 321, which may include an autogain module. The transmission line 314 may be of any type, including electrical transmission lines (e.g., coax, shielded twisted pair, unshielded twisted pair, and traces on a printed circuit board, such as, for example, single-ended and differential transmission lines).

Figure 4:
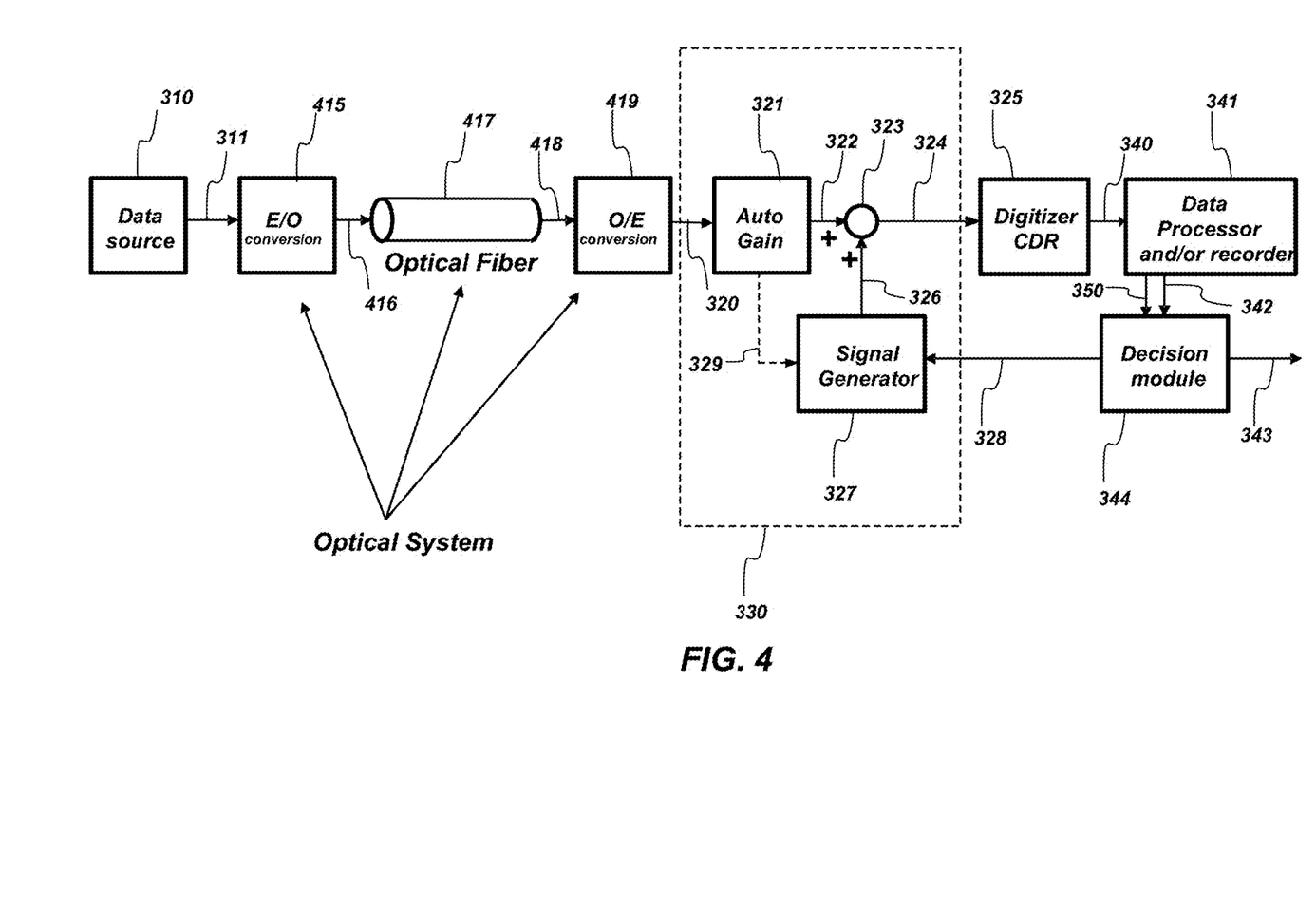
FIG. 4 is a block diagram of a communication channel with signal integrity diagnostics according to embodiments of the present disclosure that include optical communication links.

FIG. 4: is a block diagram of a communication channel 360 with signal integrity diagnostics according to embodiments of the present disclosure that include optical communication links. In this embodiment, an optical transmission line may be used. On the transmission side, an electrical-to-optical converter 415, creates an output optical signal 416, which is transmitted over an optical fiber 417. At the receive side, an optical-to-electrical converter 419 converts the optical signal 418 back to an electrical signal, before it becomes an input signal 320 to the receiver 321 with auto-gaining. For the optical data, the same encodings and levels, like 2-level or multiple levels, may be used. All other parts of FIG. 4 are the same as for FIG. 3 and, therefore, need not be described in detail.

Returning to FIG. 3, at the receive end, the receiver 321 may include autogain circuitry and/or an auto-adaptive equalizer configured to bring a voltage amplitude of the signal to a known value, providing a relatively open EYE in a regulated output signal 322. For example, and not limitation, the embodiment discussed herein uses a pre-determined voltage amplitude of 600 mV for the regulated output signal 322.

The regulated output signal 322 is one input to a summation module 323, which generates a summation output 324. The summation output 324 feeds a CDR module 325, that samples the summation output 324. The CDR module 325 may be any type of digitizer (which may be further characterized as a "clock and data recovery module") configured to recover a clock (e.g., using a phase lock loop or a delay lock loop) and sample the data encoded in the summation output 324 to generate recovered signals 340, which may include a clock signal and a data signal.

The data processor 341, which may be configured as, or include, a data recorder, includes one or more error checks (e.g., through parity bits, Cyclic Redundancy Check (CRC) errors, and forward error correction systems). The data processor 341 may be configured as a microprocessor, microcontroller, and/or dedicated circuitry.

The disturbance generator 327 is configured to generate a disturbance signal 326 that is the second input to the summation module 323. Thus, the summation module 323 combines the regulated output signal 322 with the disturbance signal 326 and generates the summation output 324 responsive to the combined signals.

By adding a disturbance (i.e., noise) to the regulated output signal 322 in a controlled way, at a position just after the receiver 321 and before the sampler of the CDR module 325, a controlled level of jitter, and controlled amount of vertical eye closure is added to the system. The effect of the additional jitter and vertical eye closure may be checked at the digital level by monitoring the increase in errors (e.g., CRC errors and/or the bit errors). The level of eye closure can be adjusted by adding a digital signal with a known amplitude. As a result, the communication channel 360 can be tested for a preferred level of required margin. An option is to do this testing during non-data times in the signal, such as, for example, the blanking lines of the video signal, or only at moments that possible bit errors cannot lead to undesired results (e.g., car accidents).

In both the electrical and optical communication cases, some embodiments generate a regulated output signal 322 exiting the receiver 321 that has an amplitude that has been regulated. There are several ways of regulating the output amplitude for the regulated output signal 322. One such method is using a limiting amplifier as an autogain module. A limiting amplifier works well for a 2-level signaling system, in a way that the amplification gets increased and clipped such that the output has a fixed amplitude. Another way to regulate the output amplitude can be that a voltage controlled gain is applied inside the receiver 321, and the gain is increased up to a chosen maximum voltage output level. More sophisticated gaining circuits may be used that also apply equalization of the higher frequency loss that may be present in the communication channel 360. In such cases, several auto-regulations are available, one of which contains a gain for lower frequencies and another gain for higher frequencies, both auto-gaining to a regulated output signal 322 with a known (i.e., predetermined) voltage amplitude.

The summation module 323 combines the regulated output signal 322 with the disturbance signal 326, which may be set to a known amplitude. As a result, the summation module 323 creates a deterioration of the signal integrity on the regulated output signal 322. This created deterioration mimics a deterioration on top of all already present non-idealities of the communication channel 360.

The disturbance generator 327 is configured to generate the disturbance signal 326 with an output amplitude that may be set responsive to a control signal 328. The control signal 328 may be configured to define different levels of disturbance to create different levels of additional deteriorations. In general, these different levels are proportional to the pre-determined voltage amplitude of the regulated output signal 322. The disturbance signal 326 can be considered as an addition of noise, however by making it a simple 2-level digital signal, it becomes bounded (i.e., with a limited and known level of effect). The signal may be a data pattern, a Pseudo-Random Binary Sequence (PRBS) pattern, or in a simple convenient embodiment, a clock signal. The data-rate of the disturbance signal 326 should preferably be higher than the "3 dB" or "corner" frequency of the jitter transfer of the following digitizer/CDR module 325. As a non-limiting example, a digitizer/CDR module 325 running at 12.5 Gbits/second typically has a corner frequency of the jitter transfer of about 7 MHZ. So in this case, using a clock oscillator as the pattern generator, the clock could operate at a frequency of 20 MHz or higher up to several GHz.

The data processor 341 may be configured to detect an error level in its incoming data-stream on the recovered signals 340. This error can a pure bit error rate (BER) level, or any other indication that is informative. The data processor 341 may make error level estimations using a variety of techniques, for example, tracking and using parity errors, CRC errors, error data it retrieves from a forward error correction system, etc. The error level may be outputted as an error level signal 342. The data processor 341 may also generate a diagnostics-enable signal 350, which indicates when a diagnostics process can occur.

With embodiments of the present disclosure, the entire communication channel 360 from the data source 310 through the cable driver 312, transmission line 314, receiver 321, summation module 323, and CDR module 325 and ending at the data processor 341 is included in the signal integrity diagnostics. Contrast this with the conventional communication channel 160 of FIG. 1 where the diagnostics does not include the CDR module 325 or the data processor 341.

A decision module 344 may be a state-machine in a digital circuit, a program on a microcontroller, or a program module within the data processor 341 that can instruct the disturbance generator 327 through the control signal 328, to generate a level of amplitude, a data pattern, and/or a data rate on the disturbance signal 326 to be added to the regulated output signal 322 in the summation module 323. The error level signal 342 can be compared with a predetermined value to generate a pass/fail indication on a results signal 343 as discussed below with reference to FIG. 7.

The decision module 344 can also instruct the disturbance generator 327 through its control signal 328 to generate consecutively several levels of amplitude on the disturbance signal 326 to be added to the regulated output signal 322. From its learning, the decision module 344 can determine the level of available margin that is still available in the total system before an intolerable level or error gets reached, as discussed below with reference to FIG. 8. This available margin may be outputted as part of the results signal 343.

Figure 5:
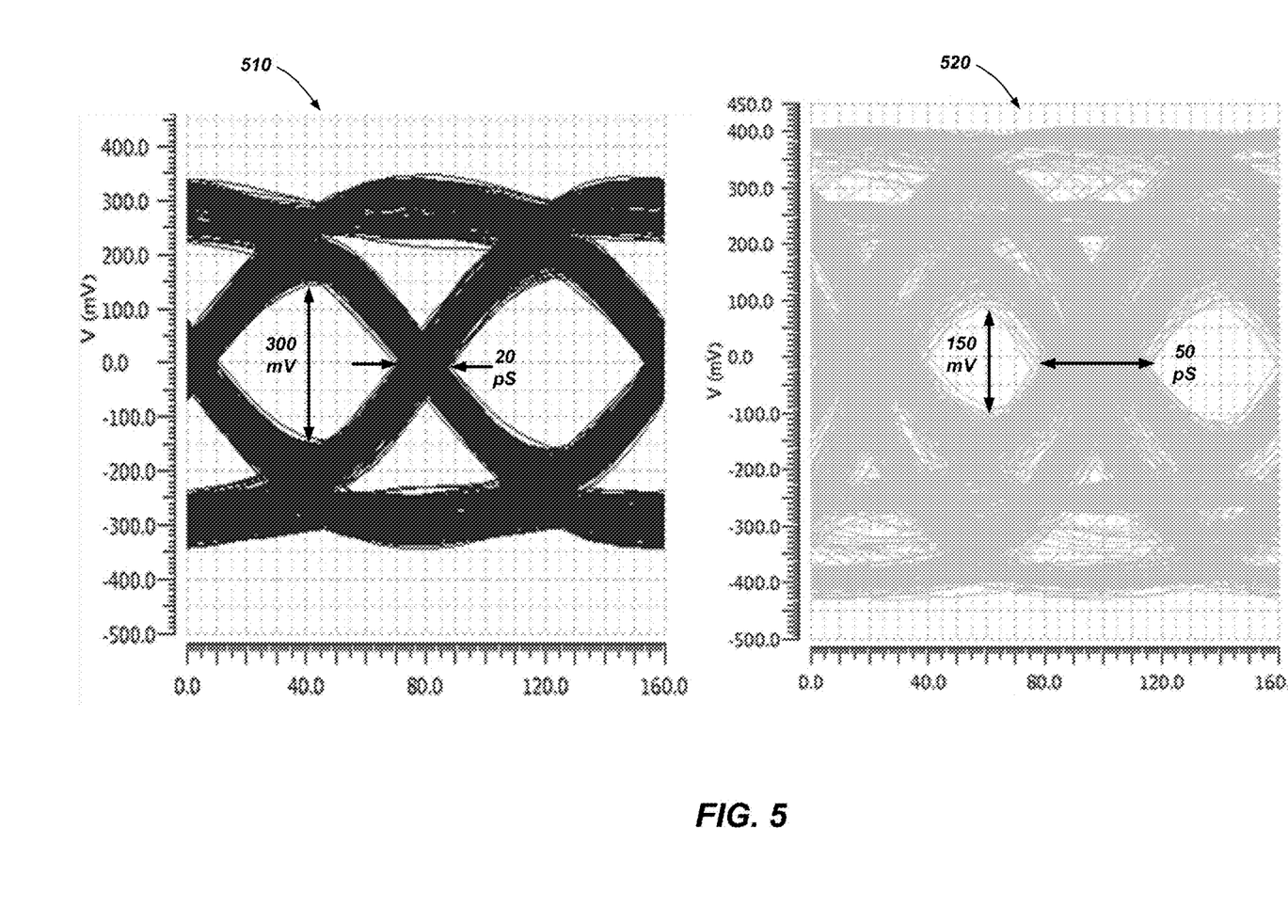
FIG. 5 illustrates an eye diagram at a receiver side before addition of a disturbance signal and after addition of a disturbance signal.

FIG. 5 illustrates an eye diagram at a receiver side before addition of a disturbance signal 326 and after addition of a disturbance signal 326. The left side shows a simulation eye diagram 510 of a 12.5 Gbps regulated output signal 322, after equalization by the autogain module in the receiver 321. As shown in FIG. 5, the differential amplitude has been regulated to 600 mV. The vertical EYE opening is about 300 mV, and the jitter is about 20 picoseconds.

The right side shows an eye diagram 520 of the summation output 324 after a 300 mV disturbance signal 326 (as a clock signal with a frequency of 400 MHZ) is added to the regulated output signal 322. Thus, the disturbance signal 326 is set with an amplitude at a 50% proportion relative to the amplitude of the regulated output signal 322. The jitter has thereby increased in a controlled way, to 50 ps, and the EYE opening has decreased to about 150 mV. Notably, the left and right EYE diagrams have a slightly different Y-scale.

Some embodiments may be configured without an autogain module within the receiver 321. In such embodiments, an amplitude detection module may be included to estimate the amplitude of the input signal 320 to the receiver 321. An amplitude indication signal 329 may be sent from the receiver 321 to the disturbance generator 327 and/or the decision module 344. The amplitude indication signal 329 indicates an amplitude of the input signal 320 to the receiver 321 without any autogain function. From the amplitude indication signal 329, the decision module 344 and/or the disturbance generator 327 can determine an appropriate voltage level for the disturbance signal 326 that is proportional to the regulated output signal 322, which in this case may not include any change in amplitude.

Figure 6:
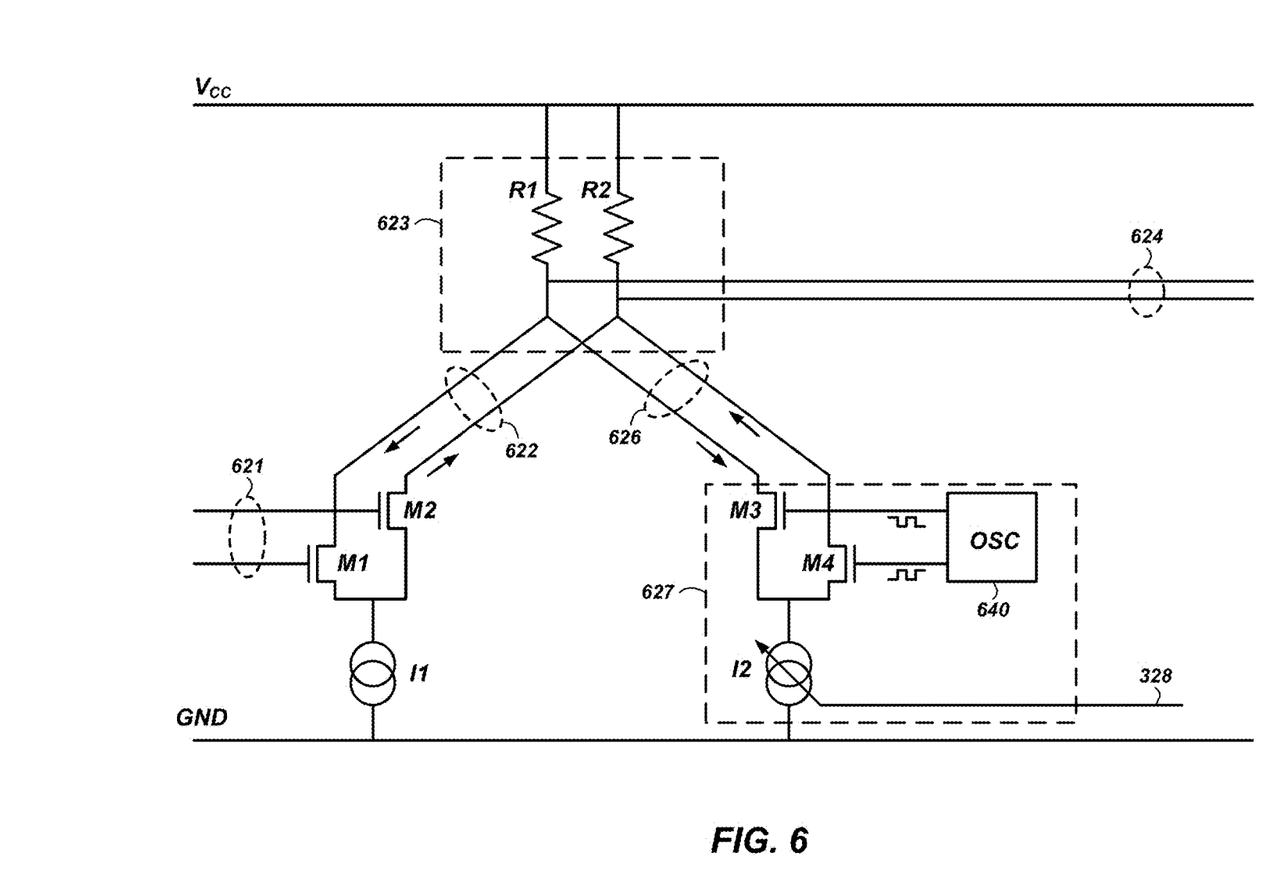
FIG. 6 is a circuit diagram illustrating one example of a summation circuit that may be used in embodiments of the present disclosure.

FIG. 6 shows a circuit diagram illustrating one non-limiting example of a summation circuit 623 that may be used in embodiments of the present disclosure. Also included in FIG. 6 is one non-limiting example of a disturbance generator 627. The summation may be performed in many suitable ways, using many suitable circuits, such as, for example, operational amplifiers and differential amplifiers. The embodiment of FIG. 6 is included as one non-limiting example of a circuit suitable for high-speed applications.

In FIG. 6, the signals in and out of the summation module 323 are treated and conveyed by differential signaling using Current Mode Logic (CML) principles. Thus, the receiver 321 (FIG. 3) ends, for example, in a CML stage providing output signals 621 to transistors M1 and M2. Transistors M1 and M2 are coupled to a current source I1 and resistors R1 and R2, respectively. The output of transistors M1 and M2 is a differential current signal 622, that goes to the adder 623, made up of resistors R1 and R2. From the right side, the disturbance signal 626 is provided as a differential current coming from a signal generator 627. The disturbance signal 626 is added to the differential current signal 622, through ohms law on resistors R1 and R2. The differential voltage on those resistors serve as the output signal 624 that is sent to the Digitizer/CDR module 325 (FIG. 3).

The differential current signal 626 is generated in generator 627, and is settable in amplitude through a variable current source 12, driven by the control signal 328 from the decision module 344 (FIG. 3). The output of the variable current source 12 is tuned into a differential current through transistors M3 and M4. In this embodiment, the disturbance signal 626 is generated as a clock signal by an oscillator 640.

Figure 7:
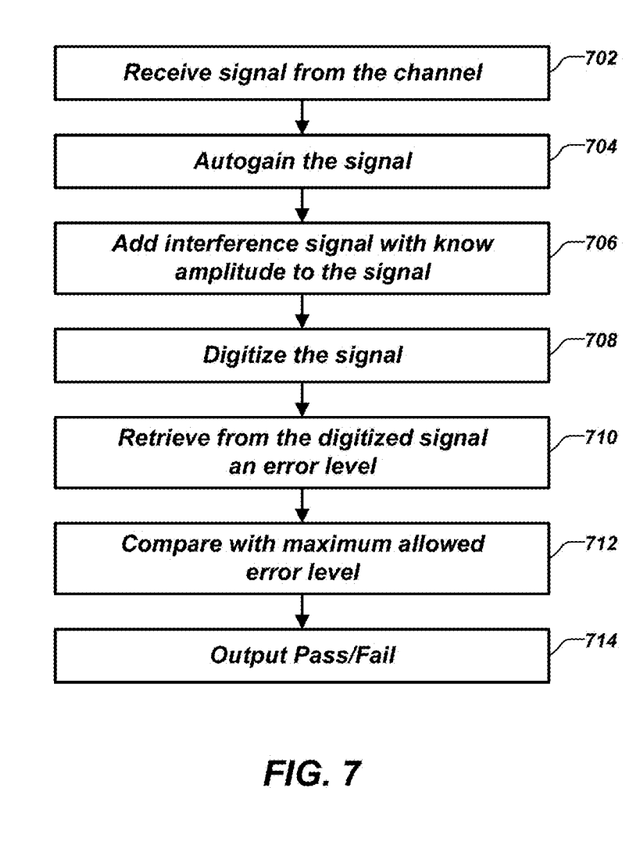
FIG. 7 is a flow diagram illustrating a process of performing run-time signal integrity diagnostics on a communication channel.

FIG. 7 is a flow diagram illustrating a process of performing signal integrity diagnostics on a communication channel 360, according to embodiments of the disclosure. Referring to FIGS. 7 and 3, at process block 702, a signal is received from the transmission line 314. At process block 704, the signal may undergo an autogain process to set the amplitude to a pre-determined voltage level. At process block 706, an interference signal 326 (also referred to herein as a "disturbance signal 326") is generated with a known amplitude proportional to the amplitude of the auto-gained signal. At process block 708, the resulting summation is digitized by the CDR module 325. At process block 710, the digitized summation signal is analyzed by the data processor 341, as discussed above, to determine an error level. At process block 712, the error level is compared to a maximum allowed error level. At process block 714 the result of the comparison is output as a pass/fail indication on the results signal 343.

Figure 8:
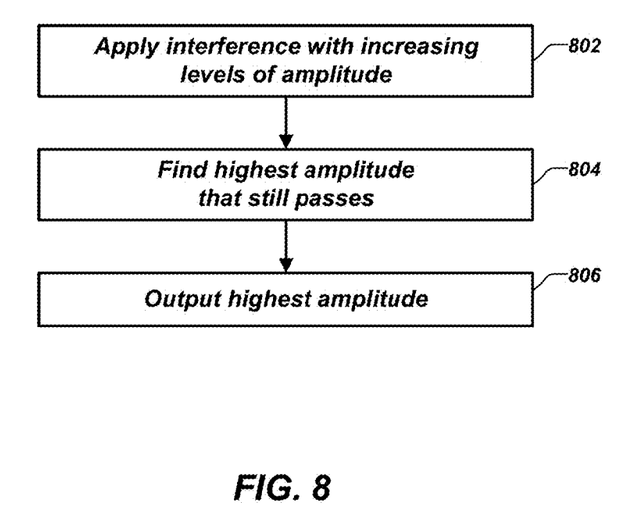
FIG. 8 is a flow diagram illustrating a process of determining run-time available signal integrity margin for a given communication channel.

FIG. 8 is a flow diagram illustrating a process of defining signal integrity that is sufficient for a given communication channel 360. Referring to FIGS. 8 and 3, at process block 802, the decision module 344 instructs the disturbance generator 327 through the control signal 328 to generate consecutively several levels of amplitude on the disturbance signal 326 to be added to the regulated output signal 322. At process block 804, from its learning, the decision module 344 can determine the level of available margin that is still available in the total system. At process block 806, a highest amplitude that passes and/or an available margin may be outputted as part of the results signal 343.

In one embodiment, the timing of when the disturbance signal 326 is added to the regulated output signal 322 is managed to certain time periods where errors in the signal would not be considered a problem in the reception or processing of the data in the data processor 341. For example, when transmitting video data, the signal integrity diagnostics may be performed during blanking periods, where the error effects are not crucial (i.e., consequential) to the operation of the total system. The diagnostic operations may be synchronized to blanking periods responsive to, for example, a diagnostics-enable signal 350, from the data processor 341. Since the data processor 341 extracts information from its receiving data, it knows how important the received data is at every moment and may determine appropriate timing for the signal integrity diagnostics.

In one embodiment, the data source 310 is configured with information about the relative importance of the transmitted data, and communicates the information about the important of the transmitted data to the data processor 341. Thus, the data source may communicate an indication of a time period that would be good for performing signal integrity diagnostics, or transmit an indication of a time period that would be bad for performing a signal integrity diagnostics. Depending on the type of encoding, this communication may be organized in a suitable way for the given encoding. For example, when using 8b/10b coding, a k-code may be dedicated for the onset of unimportant data, and another k-code to the start of crucial data for the system. In some cases, the second k-code may be repeated several times to ensure that the start of crucial data is not missed by an actual bit-error that is due to the jitter insertion. In response to the indications from the data source, the receive side may determine appropriate periods for applying the disturbance signal. As a non-limiting example, the data processor may decode the indications from the data source and generate the diagnostics-enable signal 350 to tell the decision module 344 when to start/stop the jitter addition.

Figure 9:
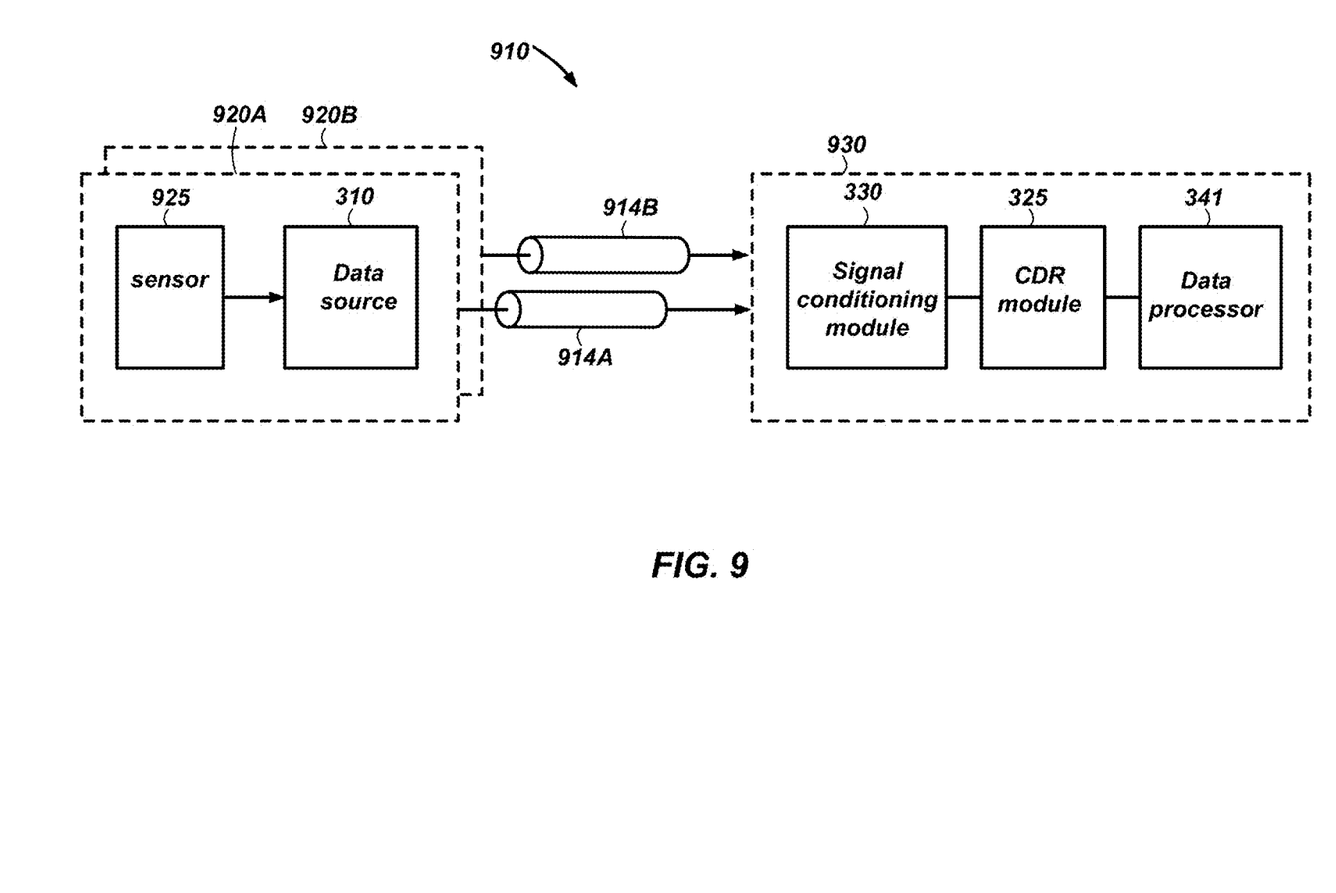
FIG. 9 is a block diagram illustrating a communication system including embodiments of the present disclosure.

FIG. 9 is a block diagram illustrating an example communication system 910 including embodiments of the present disclosure. One or more transmit sides (920A, 920B) include one or more sensors 925 or other suitable information sources 925. A data source 310 may be coupled to the sensor and the data source 310 is configured to drive a transmission lines (914A, 914B, e.g., 314 as shown in FIG. 3 and/or 415, 417, 419 as shown in FIG. 5) to convey data from the one or more sensors 925 to a receive side 930. The receive side 930 may include the signal conditioning module 330, the CDR module 325, and the data processor 341 as shown in FIGS. 3 and 4.

Many applications for communication channels 360 within a communication system 910 may incorporate the signal integrity techniques, including without limitation, for diagnostics, and systems described herein. By way of non-limiting example, some communication systems 910 may be configured to include communication channels 360 for applications using sensor information such as, for example, image capture, image processing (e.g., a frame grabber), and image data transfer. Other sensor information may include data from sensors such as, for example, proximity sensors, environmental sensors, and other suitable sensors for object and event detection. These communication channels 360 according to embodiments of the present disclosure may be included in many general systems and embedded systems such as, for example, factory automation systems, automobile vision systems and machine vision systems, security video systems, facial image capture and recognition systems, object scanning systems that incorporate image capture, industrial inspection systems, high-resolution video capture, and more.

Moreover, communication systems 910 including embodiments of the present disclosure may be implemented in various configurations. As a non-limiting example, the transmission lines may be bi-directional and the transmit sides (920A, 920B) and receive sides 930 may be similar so each side can transmit data as well as receive and process data according to embodiments of the present disclosure. As another non-limiting example, multiple transmit sides (920A, 920B) may share a single transmission line 914. As other non-limiting examples, the systems may be configured with multiple nodes in different topologies, such as, for example peer-to-peer networks, ring topologies, mesh topologies, and client/server type networks.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While particular advantages, including over conventional methods and systems, have been described in connection with some embodiments of the present disclosure, one of ordinary skill in the art will recognize that other advantages exist. Moreover, drawbacks and deficiencies of conventional systems and methods other than those described herein may be improved upon or overcome by the embodiments described herein.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed and the legal equivalents thereof. In addition, features from one embodiment may be combined with features of another embodiment while still being encompassed within the scope of the invention as contemplated by the inventor.

Additional non-limiting embodiments of the disclosure include:

Embodiment 1

A receiver side of a communication channel, comprising: an autogain module configured to condition an input signal from a transmission line by automatically adjusting a gain between the input signal and a regulated output signal to generate a pre-determined voltage amplitude on the regulated output signal; a disturbance generator configured to generate a disturbance signal with an amplitude proportional to the pre-determined voltage amplitude; a summation module configured to add the disturbance signal to the regulated output signal to generate a summation output; a clock and data recovery module configured to sample the summation output and generate at least a data signal from the sampled summation output; and a data processor configured to analyze a signal integrity of the data signal.

Embodiment 2

The receiver side of Embodiment 1, further comprising a decision module configured to further analyze the data signal by: determining an error level in the data signal; comparing the error level to a maximum allowed error level; and reporting a result of the comparison on a results signal.

Embodiment 3

The receiver side of any one of Embodiments 1 and 2, wherein the autogain module is further configured to adjust a gain on the input signal with a voltage controlled gain to set the regulated output signal to a substantially near a chosen maximum voltage level.

Embodiment 4

The receiver side of any one of Embodiments 1 to 3, wherein the transmission line is configured to carry an electrical signal.

Embodiment 5

The receiver side of any one of Embodiments 1 to 4, wherein the transmission line is configured to carry an optical signal and further comprising an optical-to-electrical converter between the transmission line and the autogain module.

Embodiment 6

The receiver side of any one of Embodiments 1 to 5, wherein the disturbance generator is further configured to generate the disturbance signal as an oscillating signal with a frequency substantially higher than a jitter transfer frequency of the clock and data recovery module.

Embodiment 7

The receiver side of any one of Embodiments 1 to 6, wherein the disturbance generator is further configured to generate the frequency of the oscillating signal at a corner frequency of the jitter transfer frequency.

Embodiment 8

The receiver side of any one of Embodiments 1 to 7, wherein the disturbance generator is further configured to generate the disturbance signal with an amplitude substantially near 50% of the pre-determined voltage amplitude.

Embodiment 9

A receiver side of a communication channel, comprising: a receiver configured to estimate an amplitude of an input signal and generate an amplitude indication signal; a disturbance generator configured to generate a disturbance signal with an amplitude proportional to an amplitude of the input signal and responsive to the amplitude indication signal; a summation module configured to add the disturbance signal to the input signal to generate a summation output; a clock and data recovery module configured to sample the summation output and generate at least a data signal from the sampled summation output; and a data processor configured to analyze a signal integrity of the data signal.

Embodiment 10

The receiver side of Embodiment 9, wherein the data processor is further configured to determine the amplitude proportional to the amplitude of the input signal responsive to the amplitude indication signal.

Embodiment 11

The receiver side of any one of Embodiments 9 and 10, wherein the disturbance generator is further configured to determine the amplitude proportional to the amplitude of the input signal responsive to the amplitude indication signal.

Embodiment 12

The receiver side of any one of Embodiments 9 to 11, wherein the disturbance generator is further configured to generate the disturbance signal as an oscillating signal with a frequency substantially higher than a jitter transfer frequency of the clock and data recovery module.

Embodiment 13

The receiver side of any one of Embodiments 9 to 12, wherein the disturbance generator is further configured to generate the frequency of the oscillating signal at a corner frequency of the jitter transfer frequency.

Embodiment 14

A method of diagnosing signal integrity of a communication channel, comprising: receiving an input signal from a transmission line of the communication channel; performing an autogain function on the input signal to generate a regulated output signal with a pre-determined voltage amplitude; adding a disturbance signal to the regulated output signal to generate a summation output; digitizing the summation output; and analyzing the digitized summation output to determine an error level.

Embodiment 15

The method of Embodiment 14, further comprising: comparing the error level to a maximum allowed error level; and reporting a result of the comparison on a results signal.

Embodiment 16

The method of any one of Embodiments 14 and 15, further comprising adjusting the gain of the autogain function with a voltage controlled gain to set the regulated output signal to substantially near a chosen maximum voltage level.

Embodiment 17

The method of any one of Embodiments 14 to 16, wherein: digitizing the summation output further comprises recovering a clock signal and a data signal from the summation output; and analyzing the digitized summation output comprises analyzing the data signal; and further comprising generating the disturbance signal as an oscillating signal with a frequency substantially higher than a jitter transfer frequency from the process of recovering the clock signal and the data signal.

Embodiment 18

The method of any one of Embodiments 14 to 17, wherein the frequency of the oscillating signal comprises a corner frequency of the jitter transfer frequency.

Embodiment 19

The method of any one of Embodiments 14 to 18, wherein generating the disturbance signal generates an amplitude of the disturbance signal substantially near half of the pre-determined voltage amplitude.

Embodiment 20

A method of diagnosing signal integrity of a communication channel, comprising: receiving an input signal from a transmission line of the communication channel; performing an autogain function on the input signal to generate a regulated output signal with a pre-determined voltage amplitude; performing two or more loops of a process, each loop comprising: adding a disturbance signal to the regulated output signal to generate a summation output; digitizing the summation output; analyzing the digitized summation output to determine an available margin in the communication channel for the current loop; and adjusting an amplitude of the disturbance signal; and generating a results signal indicating a final available margin responsive to the available margin from at least two of the two or more loops.

Embodiment 21

The method of Embodiment 20, wherein: digitizing the summation output further comprises recovering a clock signal and a data signal from the summation output; and analyzing the digitized summation output comprises analyzing the data signal; and further comprising generating the disturbance signal as an oscillating signal with a frequency substantially higher than a jitter transfer frequency from the process of recovering the clock signal and the data signal.

Embodiment 22

The method of any one of Embodiments 20 and 21, wherein the frequency of the oscillating signal comprises a corner frequency of the jitter transfer frequency.

Embodiment 23

The method of any one of Embodiments 20 to 23, wherein generating the disturbance signal generates an amplitude of the disturbance signal substantially near half of the pre-determined voltage amplitude.

Embodiment 24

A communication system, comprising: a transmit side including a data source; a transmission line configured for conveying a signal from the data source; and a receive side configured for receiving the signal from the transmission line as an input signal and comprising: an autogain module configured to condition the input signal from the transmission line by automatically adjusting a gain between the input signal and a regulated output signal to generate a pre-determined voltage amplitude on the regulated output signal; a disturbance generator configured to generate a disturbance signal with an amplitude proportional to the pre-determined voltage amplitude; a summation module configured to add the disturbance signal to the regulated output signal to generate a summation output; a clock and data recovery module configured to sample the summation output and generate at least a data signal from the sampled summation output; and a data processor configured to perform a signal integrity analysis of the data signal.

Embodiment 25

The communication system of Embodiment 24, wherein: the data source is configured to transmit an indication of a time period for the signal integrity analysis; and the data processor is further configured to enable the disturbance generator to generate the disturbance signal responsive to the indication of the time period for the signal integrity analysis.

Embodiment 26

The communication system of any one of Embodiments 24 and 25, wherein the transmission line is configured to carry an electrical signal.

Embodiment 27

The communication system of any one of Embodiments 24 to 26, further comprising: an electrical-to-optical converter between the data source and the transmission line; and an optical-to-electrical converter between the transmission line and the autogain module; and wherein the transmission line is an optical fiber.

Embodiment 28

The communication system of any one of Embodiments 24 to 27, configured as part of an automotive high-speed digital communications channel.

Embodiment 29

The communication system of any one of Embodiments 24 to 28, configured as part of an embedded system.

Embodiment 30

The communication system of any one of Embodiments 24 to 29, configured as part of an image capture system.

What is claimed is:

1. A receiver side of a communication channel, comprising:
autogain circuitry configured to condition an input signal from a transmission line by automatically adjusting a gain between the input signal and a regulated output signal to generate a pre-determined voltage amplitude on the regulated output signal;
a disturbance generator configured to generate a disturbance signal with an amplitude proportional to the pre-determined voltage amplitude;
summation circuitry configured to add the disturbance signal to the regulated output signal to generate a summation output;
clock and data recovery circuitry configured to sample the summation output and generate at least a data signal from the sampled summation output; and
a data processor configured to analyze a signal integrity of the data signal.

2. The receiver side of claim 1, further comprising decision circuitry configured to further analyze the data signal by:
determining an error level in the data signal;
comparing the error level to a maximum allowed error level; and
reporting a result of the comparison on a results signal.

3. The receiver side of claim 1, wherein the autogain circuitry is further configured to adjust a gain on the input signal with a voltage controlled gain to set the regulated output signal to a substantially near a chosen maximum voltage level.

4. The receiver side of claim 1, wherein the transmission line is configured to carry an electrical signal.

5. The receiver side of claim 1, wherein the transmission line is configured to carry an optical signal and further comprising an optical-to-electrical converter between the transmission line and the autogain circuitry.

6. The receiver side of claim 1, wherein the disturbance generator is further configured to generate the disturbance signal as an oscillating signal with a frequency substantially higher than a jitter transfer frequency of the clock and data recovery circuitry.

7. The receiver side of claim 6, wherein the disturbance generator is further configured to generate the frequency of the oscillating signal at a corner frequency of the jitter transfer frequency.

8. The receiver side of claim 6, wherein the disturbance generator is further configured to generate the disturbance signal with an amplitude substantially near 50% of the pre-determined voltage amplitude.

9. A receiver side of a communication channel, comprising:
a receiver configured to estimate an amplitude of an input signal and generate an amplitude indication signal;
a disturbance generator configured to generate a disturbance signal with an amplitude proportional to an amplitude of the input signal and responsive to the amplitude indication signal;
summation circuitry configured to add the disturbance signal to the input signal to generate a summation output;
clock and data recovery circuitry configured to sample the summation output and generate at least a data signal from the sampled summation output; and
a data processor configured to analyze a signal integrity of the data signal.

10. The receiver side of claim 9, wherein the data processor is further configured to determine the amplitude proportional to the amplitude of the input signal responsive to the amplitude indication signal.

11. The receiver side of claim 9, wherein the disturbance generator is further configured to determine the amplitude proportional to the amplitude of the input signal responsive to the amplitude indication signal.

12. The receiver side of claim 9, wherein the disturbance generator is further configured to generate the disturbance signal as an oscillating signal with a frequency substantially higher than a jitter transfer frequency of the clock and data recovery circuitry.

13. The receiver side of claim 12, wherein the disturbance generator is further configured to generate the frequency of the oscillating signal at a corner frequency of the jitter transfer frequency.

14. A method of diagnosing signal integrity of a communication channel, comprising:
receiving an input signal from a transmission line of the communication channel;
performing an autogain function on the input signal to generate a regulated output signal with a pre-determined voltage amplitude;
adding a disturbance signal to the regulated output signal to generate a summation output;
recovering a clock signal and a data signal from the summation output;
digitizing the summation output; and
analyzing the digitized summation output to determine an error level.

15. The method of claim 14, further comprising:
comparing the error level to a maximum allowed error level; and
reporting a result of the comparison on a results signal.

16. The method of claim 14, further comprising adjusting the gain of the autogain function with a voltage controlled gain to set the regulated output signal to substantially near a chosen maximum voltage level.

17. The method of claim 14, wherein:
analyzing the digitized summation output comprises analyzing the data signal; and
further comprising generating the disturbance signal as an oscillating signal with a frequency substantially higher than a jitter transfer frequency from the process of recovering the clock signal and the data signal.

18. The method of claim 17, wherein the frequency of the oscillating signal comprises a corner frequency of the jitter transfer frequency.

19. The method of claim 17, wherein generating the disturbance signal generates an amplitude of the disturbance signal substantially near half of the pre-determined voltage amplitude.

20. A method of diagnosing signal integrity of a communication channel, comprising:
- receiving an input signal from a transmission line of the communication channel;
- performing an autogain function on the input signal to generate a regulated output signal with a pre-determined voltage amplitude;
- performing two or more loops of a process, each loop comprising:
  - adding a disturbance signal to the regulated output signal to generate a summation output;
  - digitizing the summation output;
  - analyzing the digitized summation output to determine an available margin in the communication channel for the current loop; and
  - adjusting an amplitude of the disturbance signal; and
- generating a results signal indicating a final available margin responsive to the available margin from at least two of the two or more loops.

21. The method of claim 20, wherein:
- digitizing the summation output further comprises recovering a clock signal and a data signal from the summation output; and
- analyzing the digitized summation output comprises analyzing the data signal; and
- further comprising generating the disturbance signal as an oscillating signal with a frequency substantially higher than a jitter transfer frequency from the process of recovering the clock signal and the data signal.

22. The method of claim 21, wherein the frequency of the oscillating signal comprises a corner frequency of the jitter transfer frequency.

23. The method of claim 21, wherein generating the disturbance signal generates an amplitude of the disturbance signal substantially near half of the pre-determined voltage amplitude.

* * * * *

UNITED STATES PATENT AND TRADEMARK OFFICE
CERTIFICATE OF CORRECTION

PATENT NO.         : 10,277,340 B1
APPLICATION NO.    : 15/997563
DATED              : April 30, 2019
INVENTOR(S)        : Maarten Kuijk et al.

It is certified that error appears in the above-identified patent and that said Letters Patent is hereby corrected as shown below:

In the Specification

| | | |
|---|---|---|
| Column 7,  | Line 9,  | change "PAMS encoding)." to --PAM5 encoding).-- |
| Column 8,  | Line 50, | change "the "3 dB" or" to --the "3dB" or-- |
| Column 10, | Line 20, | change "source **12**, driven" to --source I2, driven-- |
| Column 10, | Line 22, | change "source **12** is" to --source I2 is-- |
| Column 11, | Line 30, | change "sources **925**. A data" to --sources. A data-- |

Signed and Sealed this
Eighteenth Day of June, 2019

Andrei Iancu
*Director of the United States Patent and Trademark Office*